Sept. 10, 1935.   J. Q. SHERMAN   2,014,267
PROTECTED RECORD FILE
Filed Feb. 25, 1929   2 Sheets-Sheet 1
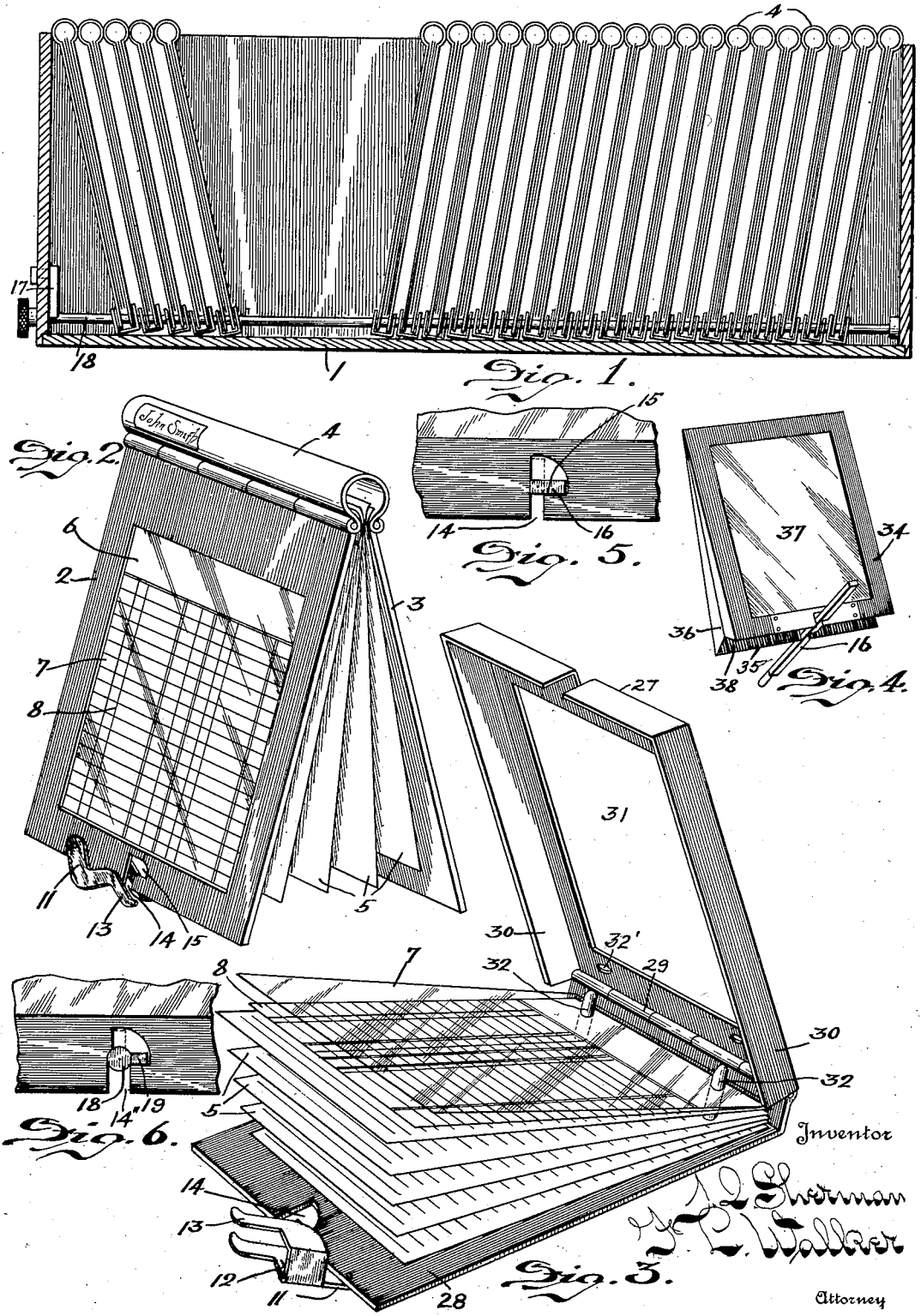

Sept. 10, 1935.  J. Q. SHERMAN  2,014,267
PROTECTED RECORD FILE
Filed Feb. 25, 1929  2 Sheets-Sheet 2
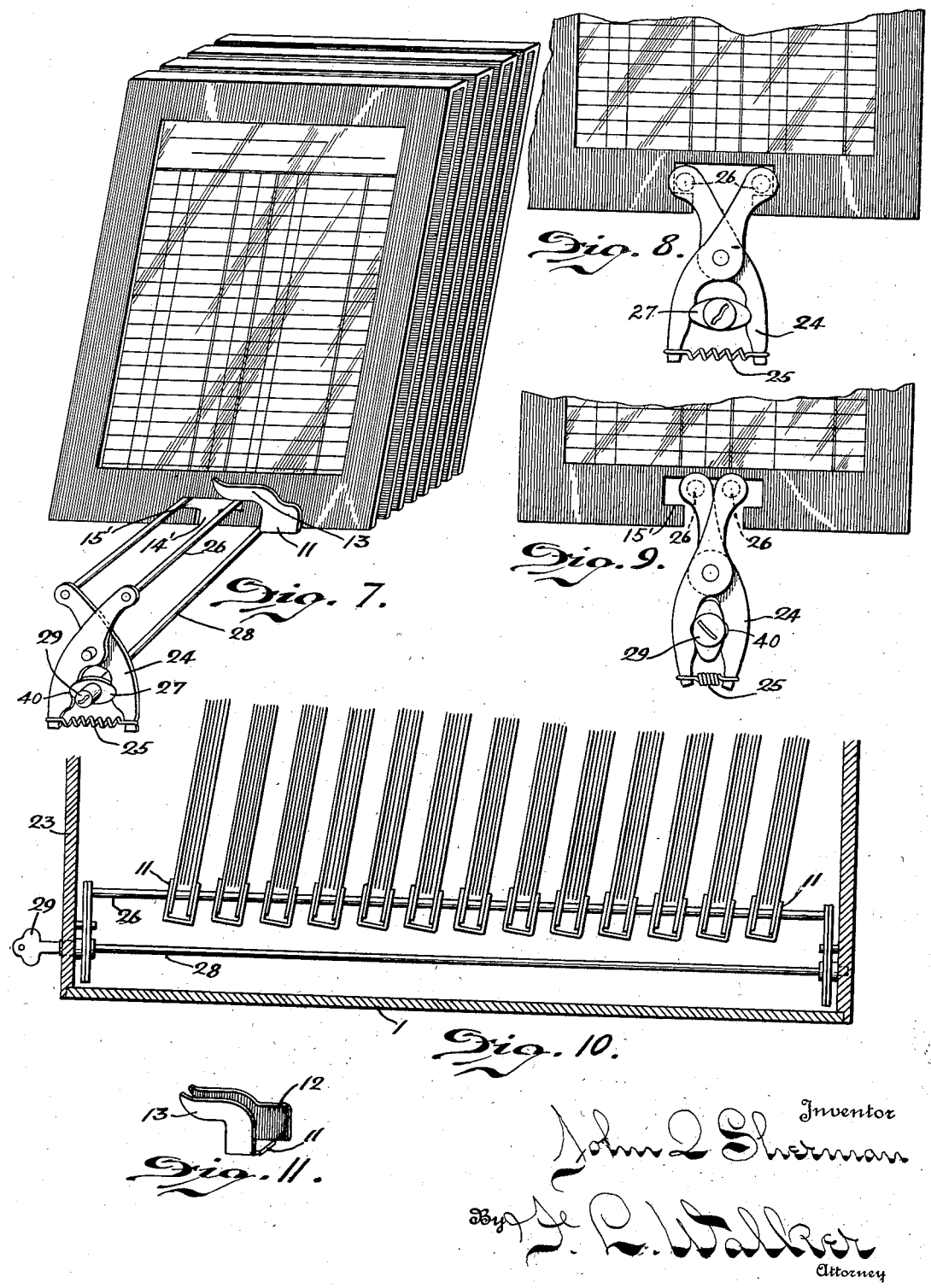

Patented Sept. 10, 1935

2,014,267

UNITED STATES PATENT OFFICE 2,014,267

PROTECTED RECORD FILE

John Q. Sherman, Dayton, Ohio

Application February 25, 1929, Serial No. 342,548

14 Claims. (Cl. 129—16)

My invention relates to files for loose memoranda, sales slips, account records and the like, wherein such filed data sheets will be protected against unauthorized removal or mutilation, and wherein the summary of each account, digest of the file contents or tabulation of data is at all times easily and readily accessible. This application is a continuation in part of application Serial No. 11,758, filed February 26, 1925, since matured into Letters Patent No. 1,731,180, of October 8, 1929.

While the file herein described is particularly applicable to retail mercantile business for containing and protecting the ledger accounts of customers, the filing device is also applicable to other lines of accounting, as for instance, a physician's accounting system, or for filing and keeping detailed record of stock requisitions in a factory, signature cards in a bank, bank records of deposit or as a file of classified general information.

In the present invention there is contemplated a collection of file units, or containers for sales slips, data sheets, memoranda leaves, or the like, preferably though not necessarily provided with binder posts, spring clips or other means for detachably engaging and retaining a collection of loose sheets or slips therein, but which may be merely a box or envelope in which the slips are loosely deposited.

Each unit or container is formed with an observation space or window through which may be observed the topmost data sheet or record page which in the case of sales slips would be the last sales record bearing the total of the account to date, it being understood that the usual practice is to carry forward the grand total from one sales slip to another. In lieu of the last sales slip or final record sheet being exposed through the observation space, a ledger card or summary sheet, or index record of the contents of the unit may be exposed to view through such observation space or window. In either instance the exposed record is protected by an overlying transparent cover sheet which prevents the removal of the sales slip, ledger card or summary sheet and prevents the changing of entries thereon.

The collection of file units or sales slip holders is preferably, though not necessarily, arranged in a file box or receptacle for to-and-fro oscillatory movement by which the ledger card or record sheet or sales total of any selected unit or holder may be exposed to view through its transparent cover. The file units or slip holders are held against removal from prearranged series while permitting such oscillatory movement by a locking rod which engages the covers of successive slip holders or file units and is locked in position in the box or receptacle. When so positioned and held within a receptacle the side walls of the latter form closures for the intervening space between the front and back covers of the several units or holders, thereby preventing unauthorized access to the data sheets or sales slips contained therein. In lieu of utilizing the wall of the receptacle to close the units, each unit may be provided with side flanges or the unit or holder may be of box or envelope form, thereby forming a complete closure within itself.

The object of the invention is to simplify the structure as well as the means and mode of operation of protected account files and the like, whereby they will not only be cheapened in construction, but will be more efficient in use, capable of being easily and quickly manipulated to disclose the summary of any desired account or filed record sheet, yet affording protection against the removal or alteration of such record sheet and to afford ample protection for the memoranda or data from which the ledger card or record sheet is compiled.

With the above primary and other incidental objects in view, as will more fully appear in the specification, the invention consists of the features of construction, the parts and combinations thereof, and the mode of operation, or their equivalents, as hereinafter described and set forth in the claims.

In the accompanying drawings, Fig. 1 is a longitudinal sectional view of a file box or receptacle containing a number of file units or slip holders of the type herein described. Fig. 2 is a perspective view of a spring-back type of slip holder or file unit removed from the receptacle. Fig. 3 is a perspective view of a unit or holder wherein the slips and ledger card are loosely held on posts or studs. Fig. 4 is a perspective view of a simple form of envelope employed as the slip holder or unit. Figs. 5 and 6 illustrate two forms of locking rods. Fig. 7 is a perspective view illustrating a modified form of retaining and locking means. Figs. 8 and 9 are detail views showing the units of the type illustrated in Fig. 7 locked and unlocked respectively. Fig. 10 is a side elevation of a collection of units of the type illustrated in Fig. 7 engaged with the retaining frame the container being shown in section. Fig. 11 is a detail of the clasp.

Like parts are indicated by similar characters of reference throughout the several views.

The present invention utilizes in combination, certain features which have heretofore been employed separately, but which are here combined and rearranged in such relationship to co-operate with each other and to afford protection against the removal or mutilation of filed matter. The file unit or holder herein described may be a conventional form of loose leaf binder of either spring-back or stud-post type, such as is frequently used by delivery men and by shippers for holding bills of lading, invoices and the like. These binders, however, are ordinarily used singly and the contents are entirely without protection, being always accessible for removal or for change and falsification of entries. It has been more or less the common practice to lock a series of index cards in a box or receptacle by transfixing them upon a retaining rod. Such cards are always accessible, however, for mutilation or for change of entries. The mere locking of independent cards against removal does not prevent falsification of the records on such cards, or the mutilation of such cards which may be torn from the locking rod without leaving trace of such removal. In the present instance, known features have been combined and reconstructed into a protected file affording security to the filed matter and in their new relationship supplying a need which was not met by the features of the present file when separately employed.

In constructing the present embodiment of a protected file there is employed a box or receptacle 1 to receive a plurality of file units or holders for independent sales slips, memoranda sheets, data leaves or the like. The file or closure unit or holder illustrated in Figs. 1 and 2 is in the form of a spring-back loose leaf binder, comprising front and rear covers or closure units 2 and 3 hinged to an intermediate spring-back portion 4. The covers 2 and 3 are preferably of sheet-metal, such as aluminum, but may be of tag board, book-binder's board or even of a heavy grade of manila board or paper. The spring back 4 as usually employed is of tubular form, longitudinally slotted, with a tendency to contract and thereby clamp within the longitudinal slot of such tubular spring back 4 any sheet or memoranda slip which may have been inserted therein. The covers 2 and 3 are hinged to this spring back or clamp portion 4. The usual mode of operation is to turn one of the covers backward to a wide-open position and employ the leverage of such cover to pry open the back clip 4 against its inherent tension to enable the insertion and removal of sales slips or memoranda sheets. The front cover 2 of this file unit or holder is provided with a window opening 6, having a transparent closure sheet 7 of celluloid, mica, glass, pyraline or similar material. Positioned behind the transparent panel 7 of the cover 2 is a ledger card 8. In lieu of the ledger card 8 there may be substituted a summary card or index pertaining to the contents of the file unit or holder. The free ends of the cover portions 2 and 3 extend somewhat beyond the extremities of the inserted sales slips or memoranda sheets 5 and are apertured, the apertures in the respective cover portions 2 and 3 registering with each other to enable the engagement therein of one or more retaining rods common to the series of units. To hold the file unit or holder in closed position and prevent the cover portion being separated by slidingly adjusting them upon the retaining rod, a clasp fastener 11 is pivoted to one of the covers and is provided with spaced ears 12, which straddle the free ends of the cover portions 2 and 3 when the unit or holder 3 is closed, and having an extended finger 13 which overhangs the unit-retaining member.

In a simple but efficient form, the retaining means may comprise a locking rod arranged transversely of the file units at the bottom thereof and mounted in the container or cabinet 1 for rocking or oscillatory motion. Two forms of such retaining means are illustrated in detail in Figs. 5 and 6. The lower margins of the file unit are apertured or slotted as at 14, such slot being inwardly enlarged to afford a shoulder or offset 15. Thus the aperture is provided with a narrow or restricted entrance slot leading to the inner enlarged opening. The locking rod 16 as illustrated in Fig. 5, comprises a flat bar pivotally mounted in the end walls of the cabinet or drawer 1 upon an axis adjacent to one of its lateral margins. Such rod 16 is capable of a rocking motion or swinging movement to different radial positions relative to such offset axis. When swung to a vertical position, as indicated by dotted lines in Fig. 5, the unit may be easily withdrawn from such locking or retainer rod 16 which is then positioned to pass easily through the narrow or restricted entrance aperture 14. However, upon a rocking motion of the locking rod 16 to a transverse position, as shown by solid lines in Fig. 5, whereby it overhangs the stop shoulder or offset 15, the file unit is securely locked against removal. The rod 16 is secured in such transverse position by a lock 17 upon the front wall of the cabinet or drawer 1.

The construction shown in Fig. 6 is quite similar to that of Fig. 5, with the exception that the locking rod comprises a round rod 18, the diameter of which substantially agrees with the width of the entrance slot 14" to the aperture, from which rod 18 there projects a feather or bead 19 adapted to overhang the stop shoulder or offset 15 when the rod is oscillated to locking position. When turned upward into alignment with the entrance slot, the rod permits the easy withdrawal and insertion of the file unit. If such form of locking rod 18 is employed it is controlled by a lock 17 similar to the lock rod 16. This lock 17 is controlled by means of a key, or it may be a combination lock of any suitable construction or design.

While the margin of the oscillatory locking rod 16 or 18 engageable in the shoulder or offset notch in the margin of the unit affords an effective and cheap locking means, there is shown in Figs. 7 to 10 a more elaborate form of retaining and locking mechanisms. In such construction the container is provided with a collapsible frame including interpivoted end members carrying longitudinal rods engageable in marginal slots in the file unit, said slots having oppositely disposed offsets providing shoulders over which the rods are projected by the expansion of the frame. In Fig. 10 which is a section and side elevation, 23 indicates the mounting which may be a receptacle or drawer, or a base upon which the file units are arranged in series. Each of the units is provided with inwardly enlarged T-shaped apertures 14' in the lower margins, the apertures having narrow entrance mouths beyond which they are laterally enlarged in opposite directions to form stop shoulders 15'. Located to the front and rear of the series of units are two pairs of interpivoted oscillatory arms 24. The lower ends of the arms of each pair are interconnected by a spring 25 which tends to oscillate the pivoted arms toward parallelism, like a pair of tongs. The corresponding arms 24 of each pair are interconnected by longitudinal rods 26 which are moved toward and from each other by the oscillation of the arms, thereby forming a collapsible frame. When the retaining frame is in contracted or collapsed condition as shown in Fig. 9, the rods 26 being positioned close to each other readily enter the contracted mouth of the aperture 14' as the units are rested upon the retaining frame. Upon expansion of the retaining frame by outward oscillation of the interpivoted arms 24, the rods 26 are separated and enter into the lateral enlargement of the apertures 14'. Being in overhanging relation with the stop shoulders 15' of the units and out of registry with the restricted mouth of the aperture, the units can not be disengaged until the retaining frame is again collapsed. To expand the frame against the tension of the spring 25, elliptical cam heads 27 are provided between the pivoted arms 24. These cam heads 27 are interconnected to rotate in unison by a shaft or rod 28. The heads are rotated by a key 29. When in transverse position in which they distend the tong-like arms 24, they engage in shallow depressions 40 to retain their adjusted positions until disengaged by means of the key.

Obviously one of the arms 24 of each pair and one of the rods 26 might be omitted, and the units be retained by the movement of one rod only into one lateral portion of the apertures.

The arm 13 of the clasp fastener 11 overhangs one of the retaining rods 26 to prevent its disengagement. Such free end is preferably tapered or cam-shaped enabling the rod 26 to complete the closing movement of the clasp if the latter is only partially oscillated.

In the event of filing retail sales slips and the like, or other memoranda in which a summary or grand total is carried forward from one slip to another, no ledger card or other cumulative summary is needed. The last sales slip of the number filed being visible through the transparent protective cover, the clerk may ascertain therefrom the amount due to be entered upon a succeeding slip, or to receive payment therefor as the case may be. To meet other conditions of use a ledger card or summary to which items are transferred from the filed slips or sheets may be desirable. In such case the summary or ledger card is preferably though not necessarily engaged in the unit by the same spring clip or other means with the memoranda slips as shown in Fig. 2.

The transparent protective panel 7 and the ledger card 8 or the summary or index card which may be substituted therefor, may be loosely positioned within the unit. The locking rod extends in such close proximity to the free margins of the ledger card and overlying protective transparent cover that such cards are retained within the unit when the holder or unit is secured within the receptacle 1.

While the form of loose leaf binder employing the tubular spring back 4 affords a convenient file unit or holder, the invention is not limited to this particular construction, but contemplates any means for detachably holding separate sales slips intermediate a pair of covers, which are secured in prearranged order or series against removal, but which are permitted to-and-fro movement to expose to view the faces of such holders or units.

In lieu of the spring-back binder, or the spring clip heretofore described for holding the sales slips, such sales slips and the ledger card or summary sheet and transparent protective cover sheet as well, may be loosely retained within the units or holders. Such sales slip and summary card together with the overlying transparent protective cover, may also be provided with perforations for engagement over studs or posts within the file unit or holder, or such card inserts may be loosely held within the file unit which being provided with side walls or flanges is complete within itself, and non-dependent upon the box or receptacle.

In Fig. 3 there is shown a construction wherein the front and back covers 27 and 28 are hinged one to the other, at 29. Either of these cover sections may be provided with marginal flanges 30, which in the present instance are shown on the front cover portion 27. This cover portion 27 is provided with an observation opening or window 31. The back cover 28 is provided with standing studs or posts 32, which for economy of manufacture may comprise tongues of material struck up from the back cover section 28. To prevent displacement of sales slips or memoranda sheets to be engaged upon the studs or posts 32, the latter are sufficiently long to project into recesses or openings 32' in the cover portion of the unit when the latter is closed. In the present instance, not only are the sales slips or memoranda sheets 5 engaged over the standing studs or posts 32, but the ledger card and transparent protective cover are also in like manner engaged upon the studs or posts 32 on top of the collection of sales slips 5, so that when the unit is closed, the ledger cards or summary sheet and protective transparent covers are intermediate the collection of sales slips and the front cover 27 and observable through the window opening 31. These units or holders when closed are retained in prearranged succession or series by the retaining rod 16, which extends through the inwardly enlarged notches 14 of successive units or holders. Each holder in itself being complete and being closed by the marginal flanges 30, it is not necessary that they be secured within a box or receptacle, but may be housed in any suitable rack or merely retained in series upon the retaining rod 16.

In lieu of the hinged holder or binder as heretofore described, there may be employed envelopes or box-like file units or holders as shown in Fig. 4. These units have their front and rear cover portions 34 and 35 permanently interconnected by a marginal wall 36. Each unit or holder is provided with an observation window 37, in the front wall 34. The units are accessible through an open end 38, through which not only the sales slips but also the ledger cards or summary sheet and transparent protective sheet are insertable. These sheets are loosely slipped into the unit or holder with the transparent protective sheet and summary card adjacent the window opening 37, and the sales slips immediately behind the ledger card or summary sheet. Such sheets and cards are held against removal by the retaining rod 16, extending through the marginal notches 14 in the front and rear walls of the unit and transversely across the open end 38.

The locked rod 16 or frame 24—26 retains the units in prearranged series or order, in which, however, they are capable of to-and-fro oscillatory movement, permitted by making the apertures 14 and 14' sufficiently larger than the diameter of the rod 16 or 26 to permit the necessary clearance.

In using this protected file in an ordinary mercantile business, a file unit or holder is provided for each credit customer whose name is entered on the top of the holder or unit. The holders or units are free for limited sliding movement to-and-fro upon the retaining rod 16, 18 or 26 as well as for oscillatory movement in a fore-and-aft direction by which the series of holders or units may be separated at any desired point to expose to view through the transparent overlying protective sheet, the ledger card showing the condition of the account of any particular customer. Thus the account of the customer is readily accessible to the clerk for the ascertainment of the total amount due, the dates of purchases and payments, but is not accessible for removal of the ledger card, nor for change or falsification of the entry. During the progress of the day's business, sales slips or memoranda sheets as the case may be are deposited between the succeeding units or holders of the file, preferably immediately in advance of the customers' accounts to which they pertain. At the close of business the proprietor or accountant releases the file units or holders by unlocking the retaining rod by means of the lock 17, and removes a selected unit. He then withdraws the ledger card of the removed unit and enters thereon the total of the day's business as indicated by sales slips or memoranda sheets pertaining to the account, and secures within the file unit or holder, the sales slips or memoranda sheets upon which the charges and entries are based. Upon returning the holders to the receptacle and locking them by locking the retaining rod, the sales slips are secured against removal by a dishonest clerk, or by a dishonest customer who might surreptitiously remove some of the sale slips. The clerk or attendant is thus able to file current memoranda or sales slips, intermediate the file units or holders and to ascertain the condition of any account or recorded summary from the ledger card, or visible sales slip, but he cannot remove such card or change the entries thereon, nor remove or mutilate the previously transferred memoranda or sales slips contained in the normally inaccessible file unit or holder, upon which the summarized record is based.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect, and the invention is, therefore, claimed in any of its forms or modifications within the legitimate and valid scope of the appended claims.

Having thus described my invention, I claim:

1. In a protected file for accounts and the like adapted to hold a plurality of loose leaf holders, a mounting therefor upon which the holders may be supported in series, means for detachably engaging the holders with the mounting, including pairs of tong-like interpivoted levers located at opposite ends of the file, rods connecting corresponding ends of the levers of the respective pairs, means for contracting the interpivoted levers to closely position the rods for introduction into inwardly enlarged apertures of the holders and means for subsequently expanding the interpivoted levers to separate the rods within the apertures to prevent detachment of the holders therefrom.

2. In a protected file for accounts and the like adapted to hold a plurality of loose leaf holders, a mounting therefor upon which the holders may be supported in series, means for detachably engaging the holders with the mounting including an expansible and contractible retaining frame comprising interpivoted cross levers arranged in pairs, rods connecting the corresponding ends of the levers of the pairs, means for relatively oscillating the levers to cause the rods to approach and separate toward and from each other to engage or disengage enlarged recesses in the holders, the expansion of the rods within such apertures serving to prevent removal of the holders from the series.

3. In a protected file for accounts and the like, a loose leaf holder including relatively adjustable front and back covers, between which loose slips to be filed are deposited, one of the covers having an observation opening therein, said deposited slips being perforated, studs carried by one of the covers engageable within the perforations of the slips, a transparent cover sheet superposed upon the filed contents immediately adjacent to the observation opening and through which the topmost filed sheet may be observed, and means to lock the holder against removal of the contents.

4. A protected file for accounts and the like for holding a plurality of loose leaves and adapted to be interlocked on a mounting including a pair of laterally swinging arms carrying a pair of retaining rods arranged for oscillation to move the rods into and out of locking engagement, said file including a pair of backs interconnected along one margin and aligned enlarged marginal apertures extending through and inwardly from the marginal edges of the backs opposite the interconnected edge adapted to be interlocked with the swinging retaining rods so as to prevent the removal of the protected file from the mounting when in interlocked position.

5. A protected file for accounts and the like for holding a plurality of loose leaves and adapted to be supported upon a mounting having detachable holders arranged to interlock with said protected file for preventing the unauthorized removal thereof, said protected file being characterized by front and rear covers interconnected along one margin and an inwardly enlarged aperture in the opposite margin of each and an interconnecting member carried by one of said covers arranged to interlock with the other cover for preventing the opening of the file, the holders upon the mounting adapted to be normally locked in said inwardly enlarged openings preventing the unauthorized removal of the file from its mounting.

6. A protected file for accounts and the like for holding a plurality of loose leaves and adapted to be supported upon a mounting having detachable holders arranged to interlock with said protected file for preventing the unauthorized removal thereof, said protected file being characterized by interconnected front and rear covers and a clasp fastener pivoted to one of the covers and provided with spaced ears which straddle the free ends of the cover portions when the file holder is closed, said clasp having an extended finger which overhangs the holder upon said mounting when the holder is in locked position so as to prevent the unauthorized removal of the file and contents thereof.

7. A protected file for accounts and the like for holding a plurality of loose leaves and adapted to be supported upon a mounting having detachable holders arranged to interlock with said protected file for preventing the unauthorized removal thereof, said protected file being characterized by interconnected front and rear covers forming an access opening opposite said interconnection, the margins of the access opening being provided with inwardly enlarged openings for receiving said holders to interlock the file and a clasp carried by one of said covers provided with ears straddling the free ends of the covers when the protected file is closed, said clasp having an extended finger adapted to be interlocked with said holder when the holder is in locked position.

8. A protected file for accounts and the like for holding a plurality of loose leaves and adapted to be supported upon a mounting having detachable holders arranged to interlock with said protected file for preventing the unauthorized removal thereof, said protected file being characterized by front and rear covers having interconnected margins, means for fixedly holding interleaved loose leaves therein the free margins of the covers being provided with enlarged openings extending through and inwardly from the marginal edges for receiving the holders arranged to interlock therewith to prevent the unauthorized removal of the protected file and its contents.

9. A protected file for accounts and the like for holding a plurality of loose leaves and adapted to be supported upon a mounting having detachable holders arranged to interlock with said protected file for preventing the unauthorized removal thereof, said protected file being characterized by interconnected front and rear covers, means carried by at least one of said covers for fixedly holding loose leaves inserted in said protected file, the free margins of said covers being provided with enlarged openings extending through and inwardly from the edges for receiving said holders and for preventing unauthorized removal of the protected file when said holders are in locked position.

10. A protected file for accounts and the like for holding a plurality of loose leaves and adapted to be supported upon a mounting having detachable holders arranged to interlock with said protected file for preventing the unauthorized removal thereof, said protected file being characterized by interconnected covers, means carried by at least one of said covers for fixedly retaining loose leaves inserted in said protected file, the free margins of said covers being provided with enlarged openings for receiving said holder and for preventing the unauthorized removal of the protected file when said holders are in locked position and means for interlocking said covers so as to hold the same in fixed relation with respect to each other for preventing the separation thereof.

11. A protected file for accounts and the like for holding a plurality of loose leaves and adapted to be supported upon a mounting having detachable holders arranged to interlock with said protected file for preventing the unauthorized removal thereof, said protected file being characterized by interconnected front and rear covers provided with an access opening, means for fixedly retaining loose leaves inserted in said protected file, the margins of the covers adjacent the access opening being provided with inwardly enlarged apertures for receiving said holders and cooperating therewith to prevent the unauthorized removal of the protected file when in locked position and a clasp carried by at least one of said covers provided with ears straddling the sides of the access opening to prevent the separation of the covers.

12. A protected file for accounts and the like for holding a plurality of loose leaves and adapted to be supported upon a mounting having detachable holders arranged to interlock with said protected file for preventing the unauthorized removal thereof, said protected file being characterized by interconnected front and rear covers each provided with an access opening, the margins of said openings being provided with inwardly enlarged apertures for receiving said holders and for preventing the unauthorized removal of the file from said holders when in locked position, means within the file for fixedly retaining the loose leaves therein when in closed position, and means straddling the access opening and adapted to be interlocked with said holder when in locked position for preventing separation of said covers thereby preventing the unauthorized removal of the loose leaves therein.

13. A protected file for accounts and the like for holding a plurality of loose leaves and adapted to be mounted upon an interlocking laterally moving retaining rod common to a series of holders characterized by each loose leaf holder including a pair of backs having interconnected margins, said backs forming an envelope-like structure having an access opening, each of the marginal sides thereof being provided with an inwardly enlarged aperture adapted to be interlocked with the retaining rod for preventing removal of the loose leaves therefrom when interlocked.

14. A protected file for accounts and the like for holding a plurality of loose leaves and adapted to be interlocked in a cabinet having a file engaging locking mechanism for preventing the unauthorized removal of the files from the cabinet, said file being characterized by front and back covers having one margin of each interconnected and means associated with the margins opposite said interconnected margins for releasably holding said opposite margins together, said means comprising an enlarged aperture in each cover extending through and inwardly from its corresponding marginal edge adapted to be engaged by said locking mechanism to prevent removal of the file from the cabinet.

JOHN Q. SHERMAN.